United States Patent
Pradeep et al.

(10) Patent No.: US 10,136,619 B2
(45) Date of Patent: Nov. 27, 2018

(54) INTELLIGENT PET MONITORING SYSTEM

(71) Applicant: Smilables Inc., Berkeley, CA (US)

(72) Inventors: Anantha Pradeep, Berkeley, CA (US);
Ratnakar Dev, Berkeley, CA (US);
Thomas Robbins, Berkeley, CA (US)

(73) Assignee: SMILABLES INC., Berkeley, CA (US)

( * ) Notice: Subject to any disclaimer, the term of this patent is extended or adjusted under 35 U.S.C. 154(b) by 0 days.

(21) Appl. No.: 15/568,175

(22) PCT Filed: Apr. 5, 2016

(86) PCT No.: PCT/US2016/026066
§ 371 (c)(1),
(2) Date: Oct. 20, 2017

(87) PCT Pub. No.: WO2016/171896
PCT Pub. Date: Oct. 27, 2016

(65) Prior Publication Data
US 2018/0132455 A1     May 17, 2018

Related U.S. Application Data

(63) Continuation of application No. 14/690,512, filed on Apr. 20, 2015.

(51) Int. Cl.
*G08B 23/00* (2006.01)
*A01K 29/00* (2006.01)
*A01K 27/00* (2006.01)

(52) U.S. Cl.
CPC .......... *A01K 29/005* (2013.01); *A01K 27/001* (2013.01)

(58) Field of Classification Search
CPC .. A01K 15/021; A01K 29/005; A01K 27/009; A01K 15/023; A01K 11/008; A01K 11/006; A01K 15/02; A01K 29/00; A01K 11/007; A01K 15/022; A01K 1/031; A01K 1/035; A01K 27/001; A01K 27/004; A01K 11/00
See application file for complete search history.

(56) References Cited

U.S. PATENT DOCUMENTS

2006/0011145 A1 *   1/2006   Kates ................ A01K 15/02
                                                        119/719
2007/0130893 A1 *   6/2007   Davies ............. A01K 11/008
                                                          54/1

OTHER PUBLICATIONS

"Int'l Application Serial No. PCT/US16/26066, Preliminary Report on Patentability dated Nov. 2, 2017", 9 pgs.

(Continued)

*Primary Examiner* — Thomas McCormack
(74) *Attorney, Agent, or Firm* — Kwan & Olynick LLP

(57) ABSTRACT

Provided are mechanisms and processes for more effectively monitoring pets to enhance caregiving and pet development. In one example, a system includes a pet monitoring device having a plurality of sensors that gather measurement data, such as motion and arousal, from a pet. The system also includes a monitoring hub that receives the measurement data from the pet monitoring device and analyzes the measurement data in relation to a learning receptivity model obtained from a remote platform. The measurement data is analyzed to predict a time and duration when a pet associated with the pet monitoring device will be receptive to learning.

20 Claims, 9 Drawing Sheets

(56) References Cited

OTHER PUBLICATIONS

Gary M. Weiss, "WagTag™: A Dog Collar Accessory for Monitoring Canine Activity Levels", *UbiComp'13 Adjunct*, Sep. 8-12, 2013, 9 pages.

* cited by examiner

INTELLIGENT PET MONITORING SYSTEM

CROSS-REFERENCE TO RELATED APPLICATIONS

This application is a U.S. national application under 35 U.S.C. 371 of PCT Application no. PCT/US2016/026066 (SMLBP006WO), entitled "INTELLIGENT PET MONITORING SYSTEM", filed Apr. 5, 2016, by Pradeep, which is a continuation of and claims priority under 35 U.S.C. § 120 to abandoned U.S. patent application Ser. No. 14/690,512 (SMLBP011US), entitled "INTELLIGENT PET MONITORING SYSTEM," filed Apr. 20, 2015, by Pradeep, all of which are incorporated by reference in their entirety and for all purposes.

DESCRIPTION

Technical Field

The present disclosure relates to pet monitoring devices. In one example, the present invention relates to a system for determining a pet's receptivity to learning.

Background Art

Conventional pet monitoring systems include audio or visual monitors that remotely collect aural or visual information and transmit this information to another device that allows an owner to view or hear the information. For instance, some monitoring systems include a video camera that is positioned to record movement of a pet. An owner can view the video of the pet from a remote device, such as a dedicated monitoring device or a smart phone. Similarly, a microphone can be placed in proximity to the pet to allow the owner to hear sounds associated with the pet.

Although conventional systems allow owners to monitor sounds and video of a pet from a remote device, these monitoring systems are limited to providing only rudimentary monitoring of a pet. Essentially, the monitoring systems allow an owner to hear and see the pet from a different location. Some of these systems allow the owner to communicate with the pet through a video call. However, current monitoring systems are extremely limited in nature. Owners can greatly benefit from a more robust monitoring system to improve the care and development of their pets.

SUMMARY OF INVENTION

Solution to Problem

Provided are mechanisms and processes for more effectively monitoring pets to enhance caregiving and pet development. In one example, a system includes a pet monitoring device having a plurality of sensors that gather measurement data, such as motion and arousal, from a pet. The system also includes a monitoring hub that receives the measurement data from the pet monitoring device and analyzes the measurement data in relation to a learning receptivity model obtained from a remote platform. The measurement data is analyzed to predict a time and duration when a pet associated with the pet monitoring device will be receptive to learning.

In another example, a method includes receiving measurement data at a monitoring hub from sensors associated with a pet monitoring device. The method also includes analyzing the measurement data in relation to a learning receptivity model obtained from a remote platform, where the remote platform receives information from several monitoring hubs associated with several pet monitoring devices. The method further includes predicting a time and duration when a pet associated with the pet monitoring device will be receptive to learning.

These and other embodiments are described further below with reference to the figures.

(Aspect 1)
A system comprising:
a pet monitoring device having a plurality of sensors configured to gather measurement data from a pet, the measurement data including motion and arousal; and
a monitoring hub configured to receive the measurement data from the pet monitoring device and analyze the measurement data in relation to a learning receptivity model obtained from a remote platform, the remote platform configured to receive information from a plurality of monitoring hubs associated with a plurality of pet monitoring devices, wherein the measurement data is analyzed to predict a time and duration when an pet associated with the pet monitoring device will be receptive to learning.

(Aspect 2)
The system as defined in aspect 1, wherein the pet monitoring device is wearable as a collar.

(Aspect 3)
The system as defined in aspect 1, wherein the pet monitoring device is wearable as an anklet.

(Aspect 4)
The system as defined in aspect 1, wherein the monitoring hub is further configured to suggest learning content for the pet, wherein the learning content is customized to a developmental stage associated with the pet, and wherein the developmental stage reflects past learning experiences.

(Aspect 5)
The system as defined in aspect 1, further comprising a camera and audio sensor, wherein the monitoring hub receives video and audio data from the camera and audio sensor.

(Aspect 6)
The system as defined in aspect 1, wherein learning receptivity model is periodically refined based on additional sensor data and measurement data received from the plurality of pet monitoring systems.

(Aspect 7)
A method comprising:
receiving measurement data at a monitoring hub, the measurement data obtained from a plurality of sensors associated with a pet monitoring device;
analyzing the measurement data in relation to a learning receptivity model obtained from a remote platform, the remote platform configured to receive information from a plurality of monitoring hubs associated with a plurality of pet monitoring devices; and
predicting a time and duration when a pet associated with the pet monitoring device will be receptive to learning.

(Aspect 8)
The method as defined in aspect 7, wherein the measurement data includes position and movement of the pet.

(Aspect 9)
The method as defined in aspect 8, wherein the measurement data further includes arousal.

(Aspect 10)
The method as defined in aspect 7, wherein the pet monitoring device is wearable as a collar or anklet.

(Aspect 11)

The method as defined in aspect 7, further comprising presenting learning content customized to a developmental stage associated with the pet.

(Aspect 12)

The method as defined in aspect 11, wherein the customized learning content includes informational material for an owner associated with the pet.

(Aspect 13)

The method as defined in aspect 11, wherein the customized learning content includes suggestions for an owner associated with the pet.

(Aspect 14)

The method as defined in aspect 7, further comprising determining a developmental stage associated with the pet based on the measurement data.

(Aspect 15)

The method as defined in aspect 14, wherein predicting a time and duration is based on the developmental stage (Aspect 16)

The method as defined in aspect 7, wherein analyzing the measurement data comprises processing the data measurement into an observation about the pet and comparing the observation to the learning receptivity model.

(Aspect 17)

The method as defined in aspect 16, wherein the observation includes one of sleep, mobility, stress, position, comfort, health, vigilance, or articulation.

(Aspect 18)

The method as defined in aspect 7, wherein analyzing the measurement comprises processing the data measurement into an inference about the pet and comparing the inference to the learning receptivity model.

(Aspect 19)

The method as defined in aspect 18, wherein the inference includes one of receptivity to leaning, pet well-being, presence of owner, environmental factors, safety of pet, or emotional state of pet.

(Aspect 20)

The method as defined in aspect 7, further comprising presenting leaning content customized based on previous learning associated with the pet.

DESCRIPTION OF EMBODIMENTS

Figure 1:
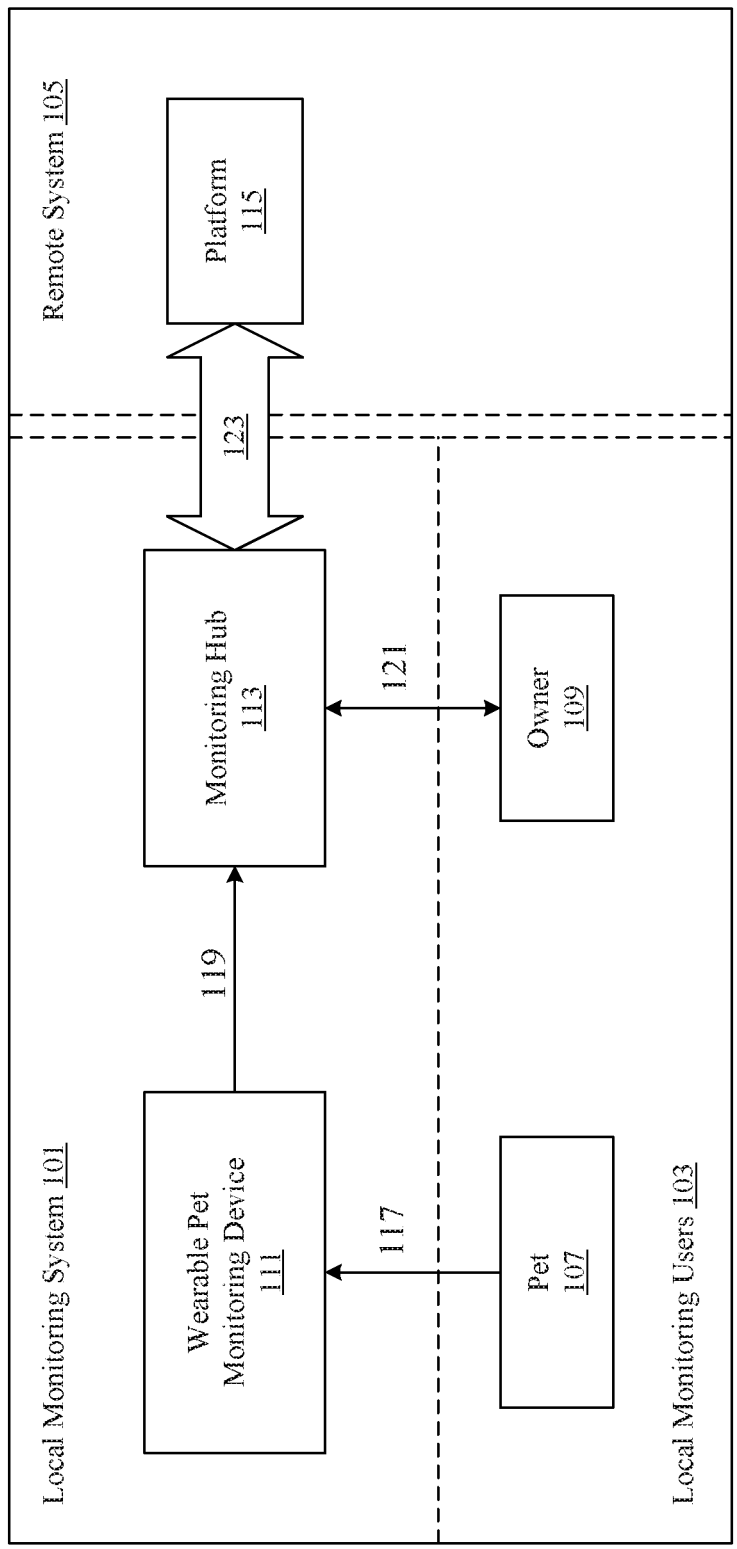
FIG. 1 is a diagrammatic representation of one example of a pet monitoring system.

Reference will now be made in detail to some specific examples of the invention in order to provide a thorough understanding of the presented concepts. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Various techniques and mechanisms of the present invention will sometimes be described in singular form for clarity. However, it should be noted that some embodiments include multiple iterations of a technique or multiple instantiations of a mechanism unless noted otherwise. Furthermore, the techniques and mechanisms of the present invention will sometimes describe two entities as being connected. It should be noted that a connection between two entities does not necessarily mean a direct, unimpeded connection, as a variety of other entities may reside between the two entities. Consequently, a connection does not necessarily mean a direct, unimpeded connection unless otherwise noted.

Conventional systems for pet monitoring typically allow owners to monitor audio and/or video of a pet from a remote device such as a smart phone, computer, etc. However, these monitoring systems are limited to providing only rudimentary monitoring of a pet. Essentially, the monitoring systems allow an owner to hear and see the pet from a remote location, and communicate with the pet in some instances. However, all of these current monitoring systems are extremely limited in nature. Owners can greatly benefit from a more robust monitoring system to improve the care and training of their pets.

Various embodiments of the present disclosure relate to providing a pet monitoring device that is wearable by a pet as a collar, anklet, or other charm. For instance, a wearable pet monitoring device can gather various measurements associated with the pet, such as motion, temperature, position, arousal, etc. These measurements can be transmitted to a monitoring hub that can process the data into useful information that can be provided to one or more owners. In some examples, environmental sensors can collect additional measurement data, such as audio levels and video data, which can also be transmitted to the monitoring hub. In some embodiments, the monitoring hub may include interaction with remote servers configured to aggregate information from multiple wearable pet monitoring devices in disparate locations.

According to various examples, the monitoring hub processes the measurement data to provide information about a pet such as sleep, mobility, stress, position, comfort, health, vigilance, articulation, receptivity to learning, pet well-being, presence of owner, environmental conditions, safety of the pet, emotional state of the pet, emotional receptivity, receptivity to learning, etc. In some examples, this information can be provided to an owner, such as through the hub directly or through a client device, such as a mobile device. Additional recommendations about care for the pet can also be provided to the owner by the monitoring hub, according to various examples.

In particular embodiments, the measurement data and/or processed measurement data is transmitted to a remote platform. This remote platform can collect measurement data and/or processed measurement data from numerous pet monitoring devices in a community. According to various embodiments, the remote platform is a remote pet developmental analysis platform. The remote pet developmental analysis platform may use this aggregated data to determine various patterns and phenomena and use this data to form additional suggestions for caregiving, teaching, etc. For instance, charts on pet growth and development can be formed with the aggregated data. These charts can then be transmitted to individual monitoring hubs and owners can see how their respective pets compare to the charts, etc. In other examples, measurement data can be used to develop models for when a pet is receptive to learning, etc. Information from these models can be provided to the individual monitoring hubs and can be provided to owners at appropriate times. In yet other examples, behavior models, etc. can be used to provide feedback to owners about how to make their pets more comfortable, etc.

With reference to FIG. 1, shown is a diagrammatic representation of one example of a pet monitoring system. According to various embodiments, the system includes a local monitoring system 101 and a remote system 105. The local monitoring system includes a wearable pet monitoring device 111 and a monitoring hub 113. The remote system 105 includes a platform 115, which is designed to collect data from a community of users. In various examples, information about a pet 107 is collected at the wearable pet monitoring device 111, this information is processed at the monitoring hub 113, and models can be developed at the platform 115. Various types of pets can benefit from the use of a pet monitoring system, such as dogs, cats, or other animals. The system can also be adapted for use with wildlife animals, especially by researchers wishing to gather information about their activity, behaviors, and health.

According to various embodiments, the wearable pet monitoring device 111 collects data and provides notifications. The wearable pet monitoring device 111 is a pet-friendly wearable device, which monitors pet activity and other pet related biometric measures. In one embodiment, the wearable pet monitoring device 111 is worn either on the neck (on a collar or as part of a collar) or ankle of a pet and collects activity and emotional state data and receptivity to learning data. For instance, the wearable pet monitoring device 111 can collect data regarding a pet's motions, orientation, and physiology. Notifications can be provided at the wearable pet monitoring device 111 in some instances. For instance, an LED on the wearable pet monitoring device 111 can indicate to an owner 109 that the battery charge is low or that the device is currently charging, etc.

In the present example, measurement data associated with the pet is gathered by or otherwise input 117 into the wearable pet monitoring device 111. This measurement data is then transmitted 119 to a monitoring hub 113. This monitoring hub 113 can perform various functions, depending on the desired application, such as data pre-processing, ambient sensing, content cache, and pet status assessment. In some examples, the monitoring hub includes learning content and a schedule. For instance, the learning content includes information for owners about what to teach to a pet and the schedule can indicate when this content should be appropriately presented, such as based on age or developmental level. This learning content can be obtained from the platform 115 in some embodiments. More specifically, the platform 115 may store various libraries of data, models, schedules, etc. that can be accessed by the monitoring hub 113. For instance, the platform may store models such as an environmental suitability model (predicting a range of environmental conditions and expected pet characteristics corresponding to these environmental conditions), pet orientation model (predicting a position of a pet based on data such as motion and geoposition), learning receptivity model (predicting a time and duration when a pet will be receptive to learning), and health model (predicting a health concern such as an epileptic seizure, etc.). These models may include thresholds for making various determinations, which can trigger notifications to an owner. For example, an environmental suitability model can include thresholds for sound pollution, visual clutter, and/or light over-intensity, and exceeding any of these thresholds may trigger a determination that the environmental conditions are not suitable for a pet. The monitoring hub 113 can select and customize content from the library to correspond to the needs and development of a particular pet 107 being monitored. According to various embodiments, the monitoring hub 113 can also provide digital signal processing, a human interface, and data security. In some examples, development models can be evaluated at the monitoring hub 113. Additionally, model-based content adaptation can be provided at the monitoring hub 113 in some applications. Furthermore, the monitoring hub 113 may provide notifications or suggestions to an owner based on a determination made at the monitoring hub 113 or platform 115. For instance, if a determination is made that environmental conditions are not suitable for a pet, the monitoring hub can make suggestions including ways to reduce noise, light intensity, visual clutter, etc. In particular, suggestions may include closing windows, turning off lights, reducing the amount of items in the room, etc.

Although not explicitly shown in FIG. 1, a mobile device can also be included in the local monitoring system 101. In some embodiments, the mobile device can communicate with the monitoring hub 113 and/or the wearable pet monitoring device 111. In addition, the mobile device can provide an interface to the local monitoring system 101 for the owner 109. For instance, the owner 109 may be able to view data about the pet via the mobile device, including information such as biometric data, video, audio, etc. In some examples, the mobile device can act as the monitoring hub 113 itself. According to various embodiments, the mobile device can provide data pre-processing, early warning, and remote observation. The mobile device can also include social and environmental content. In some instances, an owner 109 can input information about social and environmental conditions and/or the mobile device can detect various conditions using inputs such as a microphone, camera, etc. In some examples, the mobile device includes content for the owner about suggested social interactions or environmental augmentation or adjustments such as music, sounds, lights, etc.

According to various embodiments, an owner 109, petsitter, or other caregiver, is the primary user of the data from the wearable pet monitoring device 111. The owner 109 can also provide information to the system such as developmental assessments, nominal pet habits, etc., such a through a mobile device and/or the monitoring hub 113. Information can be provided to the owner 109 via monitoring hub 113 and/or a mobile device associated with the local monitoring system 101. For instance, adapted content, pet monitoring, and social engagement is provided through the monitoring hub 113 and/or the mobile device.

In the present example, data from the monitoring hub 113 is transmitted 123 to the platform 115. For instance, raw data, including biometric data, etc. is sent to the platform 115. Information from the platform 115 can also be transmitted 123 to the monitoring hub 113. Transmission 123 to and from the platform may include encryption and/or compression. Encryption can be used to protect sensitive personal information, and compression can aid in smooth and efficient transmission of the data.

According to various embodiments, the platform 115 includes software that facilitates features such as an owner portal, social interfaces, pet learning platform, and content delivery platform. Although not shown explicitly in FIG. 1, owner 109 may be able to directly interact with platform 115, such as through one of these portals or platforms. The platform 115 includes content such as pet profiles, pet de-identified data, learning materials, assessment materials, and pet trends. According to various embodiments, information sent to the platform 115 includes data such as development metrics for individual pets, etc. In addition, the platform 115 performs machine learning on aggregated measurement data, sensor data, and any other development metrics to generate models that predict upcoming behaviors, developments, activities, etc., according to various examples. For instance, measurement data can be used to generate models based on patterns in activity, and these models can be used by particular pet monitoring systems to predict an upcoming activity. Specifically, the patterns in activity can include aspects such as physical activity, emotional signals, sleep patterns, behavior, etc. The upcoming activity can include aspects such as sickness, sleep, mobility, stress, position, comfort, health, vigilance, articulation, receptivity to learning, pet well-being, presence of owner, environmental factors, safety of pet, and/or emotional state of pet.

In one example illustrating a use of the system shown in FIG. 1, the wearable pet monitoring device 111 provides continuous pet monitoring. The system detects disturbances in the room, such as with a microphone that provides data to the monitoring hub 113. The wearable pet monitoring device 111 then detects measurement data that is associated with a startle response from the pet. The monitoring hub 113 determines that the pet 107 is experiencing too many startling responses. In response, the monitoring hub 113 provides a more soothing environment (e.g. using a projector, music, white noise, etc.) or asks the owner to provide a more soothing environment.

In some implementations, the owner may also have a wearable device (not shown). The owner wearable device can be used to infer when the owner 109 is interacting with the pet 107, etc. This information can be used by the monitoring hub 113 and/or platform 115 to assess the effectiveness of certain interactions, etc. In addition, monitoring the locations of the pet 107 and owner 109 can be used to alert about a wandering or stolen pet in some applications.

According to various embodiments, the system is used for a single pet or more than one pet. For instance, a system can be used to provide instructions for two pets. This allows the owner 109 to interact with one monitoring hub 113 and/or mobile device, which can make monitoring multiple pets easier and more efficient. In such implementations, the additional wearable pet monitoring device(s) can also communicate with monitoring hub 113.

Figure 2:
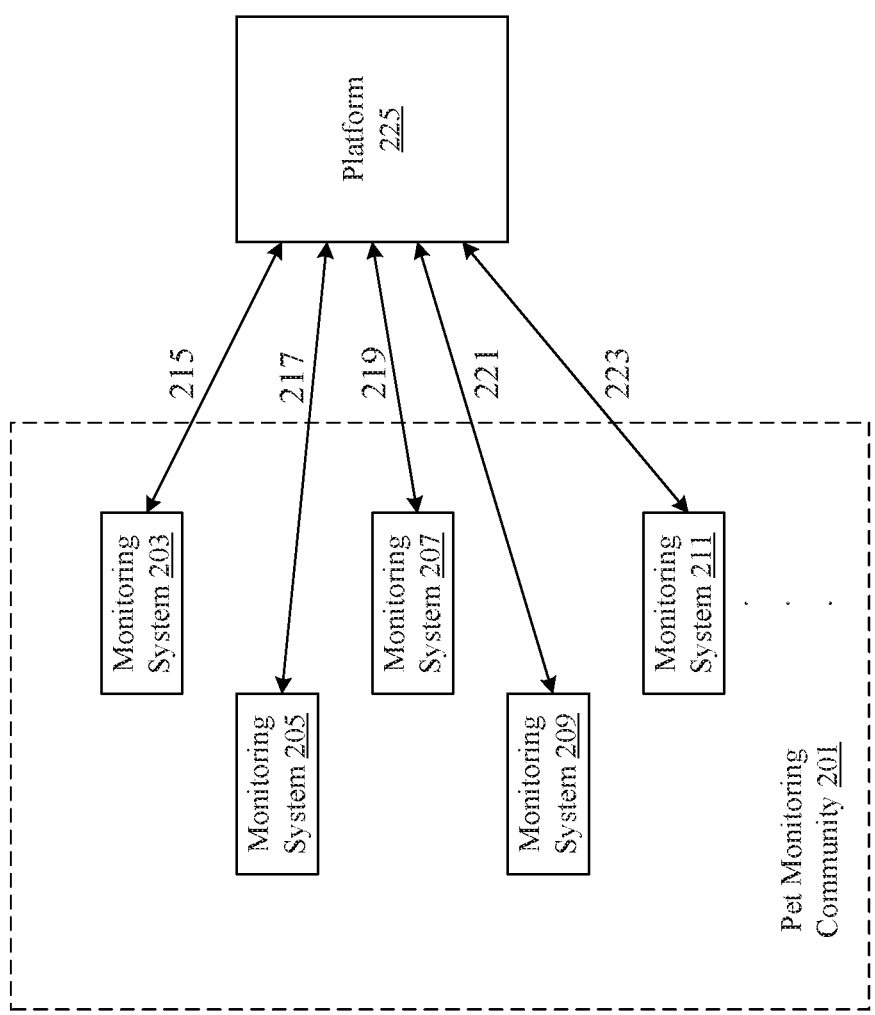
FIG. 2 is a diagrammatic representation of one example of a data aggregation system for gathering information about pets from a community of users monitoring pet activity.

With reference to FIG. 2, shown is a diagrammatic representation of one example of a data aggregation system for gathering information about pets from a community of users monitoring pet activity. As shown, numerous monitoring systems, such as monitoring system 203, 205, 207, 209, and 211 are part of a pet monitoring community. Any number of monitoring systems can be included, as indicated by the trailing dots in the figure. In some examples, the pet monitoring community 201 includes millions of pets each associated with individual monitoring systems. In these examples, development metrics from these millions of pets can be gathered at the platform 225 such as a remote pet developmental analysis platform. As referred to herein, aggregated measurement data and sensor data includes development metrics such as measurement data from monitoring devices and sensor data from peripheral devices gathered from the pet monitoring community 201. Similarly, aggregated observations, inferences, etc. refer to data aggregated from the pet monitoring community 201.

In the present example, the monitoring systems 203, 205, 207, 209, and 211 are each like the local monitoring system 101 in FIG. 1. As such, each monitoring system 203, 205, 207, 209, and 211 is associated with a different pet. Each of the monitoring systems 203, 205, 207, 209, and 211 communicates with the platform 225. According to various embodiments, information sent to the platform 225 from the monitoring systems 203, 205, 207, 209, and 211 includes development metrics, and/or any other data gathered by each of the respective monitoring systems. These development metrics (and/or other data) can be used as input to backend machine learning at the platform 225.

According to various embodiments, content such as content libraries and parameterized pet development models can be stored at the platform 225. This content can be shared with the monitoring systems 203, 205, 207, 209, and 211. For instance, information is sent to a monitoring system 203 in response to a request from the monitoring system 203. In other examples, information is sent to a monitoring system 205 at a particular developmental time associated with the pet being monitored by monitoring system 205. In yet other examples, information is sent in response to a receipt of development metrics from a particular monitoring system 207. As described above with regard to FIG. 1, platform 225 includes features such as an owner portal, social interfaces, pet learning platform, and content delivery platform. Each of the monitoring systems 203, 205, 207, 209, and 211 can access these features at the platform 225. In some embodiments, an owner portal can allow an owner to directly communicate with the platform 225, such as through a mobile device or computer, without having to communicate through a local monitoring hub. In addition, the platform 225 includes content such as pet profile, pet de-identified data, learning materials, assessment materials, and pet trends, which may also be accessible to monitoring systems 203, 205, 207, 209, and 211 in various embodiments.

According to various embodiments, machine learning can be used to develop models such as development models, health models, kinematic models, and dynamic models at platform 225. These models can be developed using the information gathered from the monitoring systems 203, 205, 207, 209, and 211 from the pet monitoring community 201. Specifically, the gathered data can be used at the platform for research. The gathered data can be used to discover new metrics, develop population statistics, spot trends, etc. For instance, applying unstructured machine learning to the vast amount of gathered measurement data, such as weight, age, gender, location, associated with numerous pets, various predictions can be made and models developed. For example, models can be developed regarding how to impart learning, social interactions, etc. Other examples include discovering trends or markers, such as characteristics that indicate a pet might get sick soon based on its sleep/wake patterns.

Various aspects can be observed and studied at the platform 225 with the help of machine learning. Some examples include wake/sleep prediction, detecting quiescent windows, determining when a pet is missing, determining alertness, and predicting a pet's receptivity to learning.

In one example, wake/sleep predictions can be studied at platform 225. Specifically, activity monitoring can be used to identify wake/sleep transitions. Based on a previous week's sleep/wake transitions, a next transition can be predicted. This type of prediction is based on pulse train completion. The time series of wake/sleep is a pulse train that should (for healthy sleep patterns) have regular pulse width and spacing. By estimating those parameters, the onset of the next wake/sleep transition and the duration of the subsequent state (whether waking or sleeping) can be predicted. As a pet grows, the characteristic spacing and width of the pulses will change. These changes typically happen on the time scale of months, so sleep predictions may look at time frames on the order of the last week. By observing patterns on this time scale, changes in the sleep patterns can be predicted on a faster time scale than those patterns evolve.

Various factors can be used to predict sleep schedules, such as Gavanic Skin Response (GSR) activity (i.e. arousal), last known sleep cycle, audio detected by a sensor, etc. For some pets, such as cats and dogs, arousal may be indicated by factors such as salivation, as detected by moisture sensors that can detect moisture from the pet's mouth from a detector in a collar, etc. In some examples, models are created for predicting sleep schedules based on a pet's data and/or aggregated data from numerous pets. According to various embodiments, the sensors include mechanisms for determining whether the pet's position, such as lying down, standing, walking, etc. Sensors may include accelerometer, magnetic sensor, gyroscope, motion sensor, step counter, rotation vector sensor, gravity sensor, orientation sensor, and linear acceleration sensor.

A wearable casing for the sensors may be worn by a pet in a particular manner such that directionality is known. For example, the wearable casing may be an anklet, collar, harness, sock, shoe, or included in a vest or other piece of clothing. An indicator may be included on the wearable directing an owner on the appropriate positioning or directionality of the wearable. In addition, observations can be made about the pet's sleep patterns and sleep state, and the pet's level of fatigue can be estimated in some examples. For instance, if the sleep schedule for the pet indicates that the pet is normally asleep at this time but is not currently asleep, then a guess can be made that the pet is probably fatigued. In some applications, suggestions can be made to the owner regarding providing a calm environment for the pet to promote sleep, avoiding stimulation or teaching, etc. According to various embodiments, models developed at the platform 225 can also be used to predict development for a particular pet when the particular pet is compared to these models.

In another example, detection of walking can be studied at platform 225. Specifically, activity data from the pet monitoring community 201 can be used to determine when a pet is walking or moving in various ways. For instance, joint angles and bone positions with respect to models that include torso bounce and ground reaction force can also indicate whether a pet is walking or moving in some other way. By analyzing data about pet movements, models can be predicted regarding walking detection. In some examples, the measurement data associated with a pet can be combined with information provided by an owner about when the pet walked, etc. Comparing a particular pet's walking to models can help predict whether the pet has an injury, etc. Mechanisms for developing models relating to walking, etc. can also be applied to data sets outside the pet category. For instance, this system could also be used with physical therapy patients of all ages.

In another example, mechanisms can be used at platform 225 to determine "quiescent windows," when a pet is inactive, quiet, and still. Developing models predicting these "quiescent windows" and using them at the monitoring systems can lift health and hygiene of the pets, such as by suggesting times for cleaning their living quarters.

In yet another example, a missing pet can be detected based on models developed at platform 225. Predictions can be made about when the pet is moving not under its own power. For instance, patterns of movement or location can be studied to determine when an anomaly is detected. In some examples, geolocation can be included to indicate when pet is traveling with someone other than an authorized owner. In some applications, an owner can be notified to check on the pet and confirm the pet's whereabouts. This can be particularly helpful in keeping pets safe not only from running away or abductions, but also if the pet is inadvertently left in a car or other location.

In another example, alertness of a pet can be studied at platform 225. Specifically, measurement data can be studied to detect when a pet is alone and alert, and the length of time the pet has been alone and alert. Detecting when a pet is alone can be based on factors such as background audio analysis, but is complicated by situations where the pet is not actually alone, but is just being ignored. Input from owners can also be included. Models can be used to predict when pets might benefit from interaction or learning experiences.

In another example, receptivity to learning can be studied at platform 225. Determining appropriate windows of time for a pet's receptivity to learning can help owners know when to present training materials or interaction in a more productive manner. In order to determine these appropriate windows, numerous factors can be considered. Specifically, data such as sleep/wake cycles, vocalization, temperature, age, gender, weight, and other biometric measures collected from pet monitoring community 201 can be considered. Additionally, data from one or more of an intentionally detector, gaze detector, shared attention detector, and cognition detector can be used to determine a pet's receptivity to learning. Furthermore, data about a pet's environment, such as audio levels, time of day, location, etc. can also be considered. Additional data from one or more owners, such self-reporting and lesson feedback can also be considered. This data can be analyzed to help determine when a pet is most receptive to training and what type of material is appropriate to present at a particular time. Models can be created that indicate windows of receptivity to learning and the appropriate teaching/training materials. These models can be used at individual monitoring systems for application to individual pets. For instance, the absence or presence of specific stimulation, as indicated by the system or from owner input, such as auditory, sensory, tactile, etc. can be used to select an age-weighted, progress-weighted learning program from a model developed at the platform 225. Specifically, knowing the developmental stage of the pet can help determine what types of training materials should be presented. According to various embodiments, a particular pet monitoring system can predict windows of receptivity when a pet is receptive to learning. In these embodiments, the pet monitoring system processes measurement data and selects and customizes learning materials appropriate for the pet. The learning materials can be customized based on factors such as the pets developmental stage, readiness, previous learning experiences, owner feedback, etc.

Figure 3:
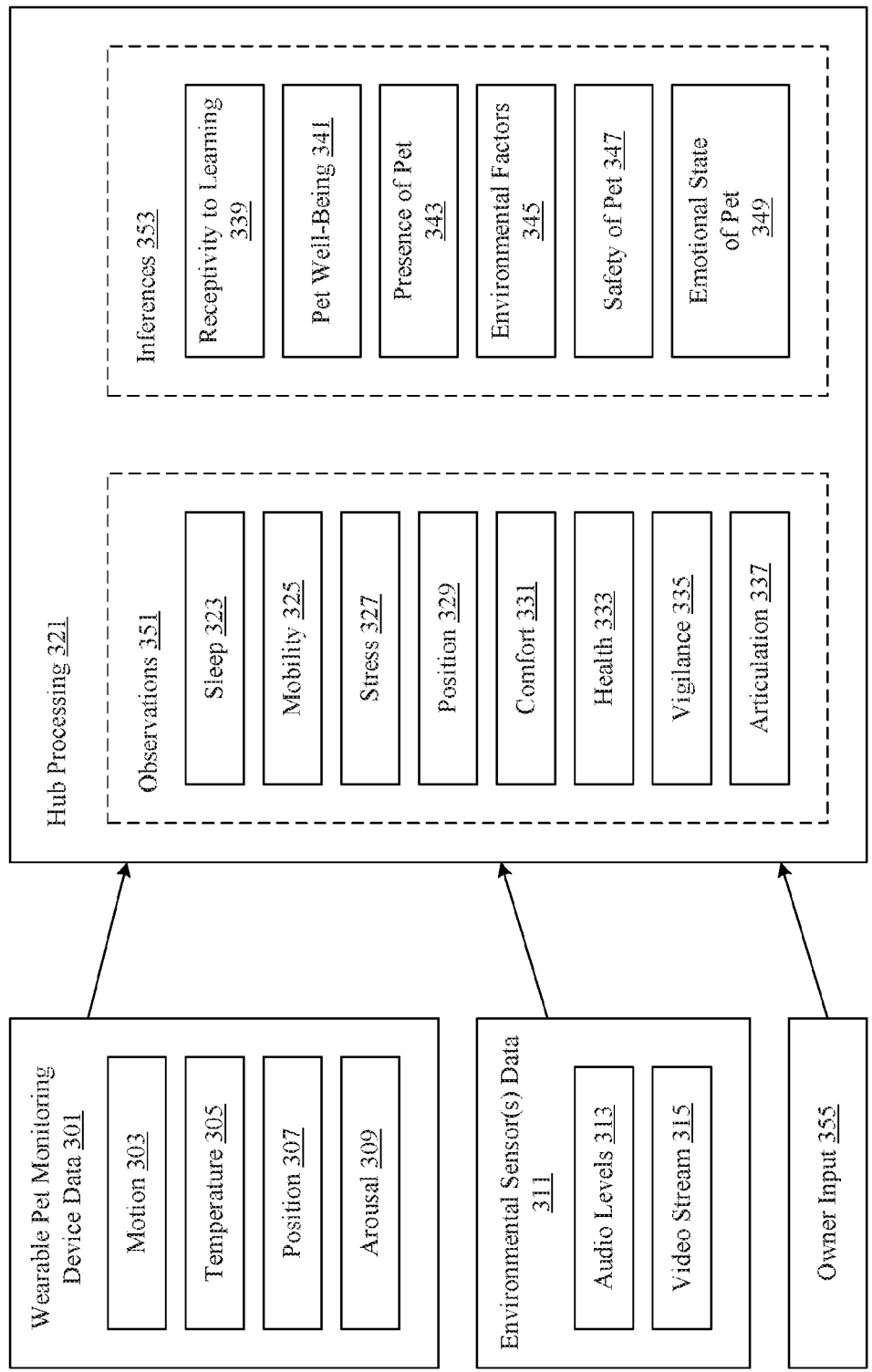
FIG. 3 is a diagrammatic representation of one example of a pet monitoring data aggregation and processing system.

With reference to FIG. 3, shown is a diagrammatic representation of one example of a pet monitoring data aggregation and processing system. This system includes a pet monitoring device, environmental sensor(s), and a monitoring hub. Measurement data is gathered by the wearable pet monitoring device and environmental sensors and sent to the monitoring hub for processing. As shown in the diagram, wearable pet monitoring device data 301 gathered by the pet monitoring device includes items such as motion 303 (i.e., activity), temperature 305, position 307, and arousal 309. In some examples, the position 307 can include a geoposition of the pet. Environmental sensor(s) data 311 gathered from devices such as microphones or cameras includes audio levels 313 and video stream 315.

However, in some examples, the environmental sensors can be omitted, such as when a simplified system is employed. For instance, if the system is used during an outing, cameras, peripheral devices, etc. may be disconnected and only input from the wearable pet monitoring device may be used.

In the present example, the monitoring hub receives data from the wearable pet monitoring device and the environmental sensor(s). According to various embodiments, the data is collected continuously around the dock. In some examples, this may mean periodic but consistent monitoring, such as at designated intervals of time. Hub processing 321 can be applied to the data received to yield various observations 351 and inferences 353. Some of the observations 351 that can be made at the monitoring hub based on data measurements include sleep 323, mobility 325, stress 327, position 329, comfort 331, health 333, vigilance (e.g. pet attention, cognitive responsiveness) 335, and articulation (i.e., vocal articulation, etc.) 337. Some of the inferences 353 that can be made at the monitoring hub based on measurement data include receptivity to learning 339, pet well-being 341, presence of owner 343, environmental factors 345, safety of the pet 347, and emotional state of the pet 349. Although observations 351 and inferences 353 are shown as different categories, various items can be categorized in either set without deviating from the scope of this example.

Numerous combinations of measurement data from the wearable pet monitoring device and/or the environmental sensor(s) can be used to make observations or inferences. According to various embodiments, data is first collected about the pet, the data is scaled, and then a model or prediction is applied to the pet. Specifically, aggregated data can be collected at the platform, as described above with regard to FIG. 2, and models, predictions, etc. can be developed. These models, etc. can then be accessed from the platform by individual monitoring hubs. A particular pet monitoring system can then perform hub processing 321 that can use these models, etc. to analyze measurement data for a particular pet.

Observations and/or inferences can be made for a particular pet and made available to an owner. This information can help the owner better care for the pet. In some examples, the information can be used to provide guidance or advice to owner, such as through the monitoring hub and/or mobile device. For instance, hub processing 321 may determine that the pet is currently in a particular position 329 that may correlate with an injury. This observation 351 can lead to a notification to the owner about this finding. In some examples, the notification can also include recommendations about how to help the injured pet, etc. In another example, the pet's growth can be monitored, such as by owner input 355, or by a sensor such as a scale (not shown) that is connected to the system as a peripheral device. This growth can be used to estimate the pet's developmental stage and from this information a schedule can be developed at the hub outlining when a pet should be taught something. In yet other examples, motion 303, such as a shake of the pet's paw can be monitored to determine motor development, blood flow can be monitored and correlated to brain development, and electrodermal activity (or breath moisture content, etc. detected by a sensor located in a collar or muzzle) can be monitored to predict health 333 occurrences such as epileptic seizures. In another example, predictions about the pet's activity can be made using data from the accelerometer and GSR, as described in more detail with regard to FIG. 4. Based on this data, a prediction can be made about whether the pet is awake/asleep, eating, walking/running, etc. Various inputs can be monitored to yield observations and predictions about the pet.

Various observations 351 can be made about the pet based on measurement data associated with the pet. For instance, sleep 323 observations can be used to predict the upcoming sleep patterns of the pet, and can alert the owner if sleep patterns are disturbed. For instance, if the sleep patterns are disturbed, this may indicate that the pet is getting sick, etc. Observations about mobility 325 can help determine how the pet is moving relative to its developmental stage and can be used to advise the owner about how to teach or help the pet at a developmentally appropriate level. Observations about stress 327 can help determine if there are conditions that could be changed to reduce the pets stress. As mentioned above, position 329 can be observed to see if a current position is associated with an injury and the owner can be notified. Position 329 can also refer to the pet's orientation, such as whether the pet is lying down, walking, running, etc. These observations can be made based on data such as motion 303 and position 307. Observations about comfort 331 can be made and findings can be provided. Observations about health 333 can also be made, such as whether the pet's temperature constitutes a fever, etc. Observations about vigilance 335 includes whether a pet is alert and awake, etc. In addition, observations about articulation 337 may include detecting vocal articulation using environmental sensor data 311 such as audio input. Although particular examples of observations are shown and described, it should be recognized that additional observations can also be made within the scope of this disclosure. Likewise any combination of observations (such as a limited set of those shown) can be used depending on the desired operation of the system.

Various inferences 353 can be made about the pet based on measurement data associated with the pet. For instance, inferences about the pet's receptivity to leaning 339 can be made. As described above with regard to FIG. 2, various factors can be used to assess receptivity to learning 339 such as developmental stage. These inferences can be used to determine when and/or what the pet should be learning. Providing appropriate learning materials (such as advice to the owner about what to teach or how to interact with the pet) at the appropriate time can help with the pet's brain development and training. Inferences about the pet's well-being 341 can be made in some examples. For instance, considering factors such as the health and emotional state of the pet can indicate the pet's overall well-being. In some examples, these inferences can help to determine how effective a particular owner is meeting the pet's needs, etc. Inferences about the presence of an owner 343 can also be made. For instance, measurement data from the pet monitoring device and/or an owner device can indicate whether the owner is present at a particular time. Inferences about environmental factors 345 can also be made. For instance, environmental sensor data 311, such as audio levels 313, can be used to assess what is good for the pet versus what is not good for the pet. In some examples, the system can use a predictive model to identify if an environment is cognitively good for a pet, using factors such as visual clutter, sound pollution, light over-intensity, not enough interaction, etc. Specifically an environmental suitability model can be used that reflects a relationship between a range of environmental conditions and expected pet characteristics corresponding to these environmental conditions. For example, visual clutter may be associated with a higher degree of stress, sound pollution may be associated with less (or lower quality) sleep, etc. Additionally, inferences can be made about safety of the pet 347. In some examples, safety may include the pet's position (e.g. injured or stuck), and other physical safety features. In other examples, safety may include whether the pet is "missing," such as if the pet has wandered off, fallen, or been taken by an unauthorized owner. Inferences about the emotional state of the pet 349 can also be made, such as whether the pet is stressed, etc. In some examples, these inferences can help to determine how effective a particular owner or interaction is for placating the pet's stress. In other examples, these inferences can be used to determine what types of activities, environments, schedules, etc. best suit this particular pet. Although particular examples of inferences are shown and described, it should be recognized that additional inferences can also be made within the scope of this disclosure. Likewise any combination of inferences (such as a limited set of those shown) can be used depending on the desired operation of the system.

Figure 4:
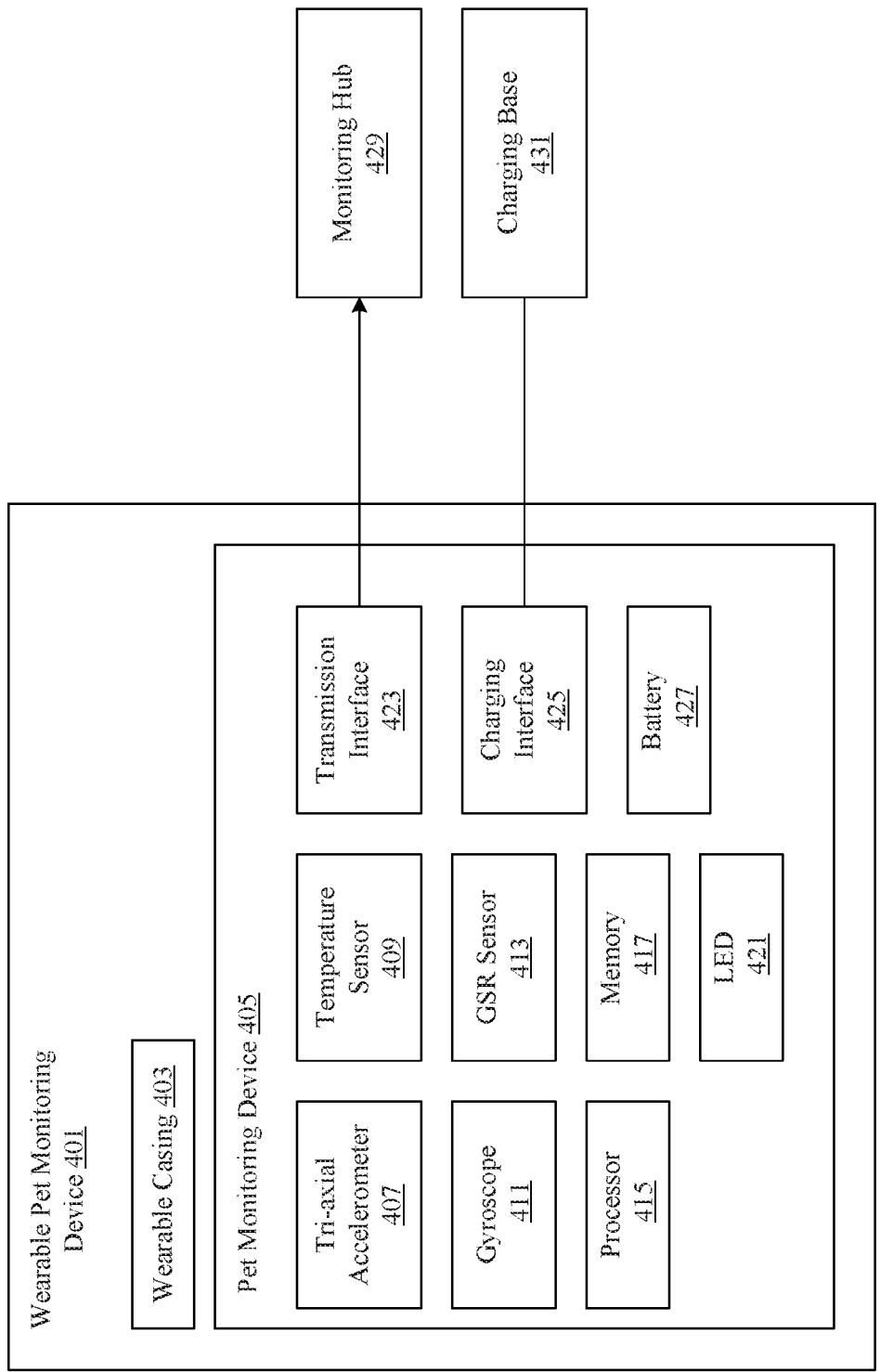
FIG. 4 is a diagrammatic representation of one example of a wearable pet monitoring device.

With reference to FIG. 4, shown is a diagrammatic representation of one example of a wearable pet monitoring device. The wearable pet monitoring device 401 is a pet-friendly wearable device, which monitors pet activity and other pet related biometric measures. As shown in the present example, the wearable pet monitoring device 401 includes a wearable casing 403 and a pet monitoring device 405. According to various embodiments, the pet monitoring device 405 is detachable from wearable casing 403, examples of which are described with regard to FIGS. 5A-5C.

In one embodiment, the wearable pet monitoring device 401 allows the pet monitoring device 405 to be worn on the ankle of a pet. In other examples, the wearable pet monitoring device 401 can be worn on a collar or as its own collar. The pet monitoring device collects activity and emotional state data. In the present example, this data is collected continuously around the clock. Specifically, pet monitoring device 405 collects data and provides notifications. In various examples, the pet monitoring device 405 can be used for data logging. According to various embodiments, the device is expected to store data from multiple sensors and also do moderate processing of the data from the sensors. This processing may include filtering, dimensionality reduction and cleanup of the raw data. Because the device is also intended for use as a pet monitor, low-latency processing of some sensors e.g. position may be required. However, in some instances, the pet monitoring device 405 may not store content. By including less content and/or other features, the pet monitoring device 405 can be designed with a smaller size to allow for a more comfortable experience for the pet. In addition, including fewer features can also reduce complexity of the device, and thereby reduce possible malfunctions, etc.

In the present example, pet monitoring device 405 includes various components, such as tri-axial accelerometer 407, temperature sensor 409, gyroscope 411, galvanic skin response (GSR) sensor 413, processor 415, memory 417, light emitting diode (LED) 421, transmission interface 423, charging interface 425 and battery 427. In some examples, a sensor can be included that detects the amount of moisture in the pet's breath, especially with pets that don't sweat through their skin. This type of moisture sensor could replace or supplement the GSR sensor. The tri-axial accelerometer 407 measures a pet's activity, such as movements registering more than about 50 Hz in some examples. The accelerometer data is used to measure the pet's movement. This movement can also include breathing motions, especially if the device is worn around the neck. The temperature sensor 409 measures the pet's body temperature. According to various examples, the pet's body temperature is continuously monitored. The gyroscope 411 measures the pet's orientation. The GSR Sensor 413 measures galvanic skin resistance (GSR). For instance, the GSR sensor 413 can measure the amount of sweat or moisture detected on the body. The GSR is a low latency arousal measurement, and can be used to measure the pet's stress levels.

In the present example, the processor 415 can be an ARM Cortex M0-M3, or the like, depending on the application. In some examples, the processor 415 can have limited or no digital signal processing (DSP). The memory 417 can be of any size, depending on the application. In some examples, the memory 417 can have a size of 384 kb. The transmission interface 423 can be used to communicate with a monitoring hub 429. Specifically, measurement data can be sent from the pet monitoring device to monitoring hub 429. According to various examples, transmission interface 423 can use a transmission protocol such as Bluetooth LE (BLE 4.0), although any suitable protocol can be used.

In the present embodiment, the pet monitoring device 405 includes an LED 421 that can communicate status information to an owner. For instance, the LED 421 can indicate that the device is charging when the LED is illuminated. In some examples, the LED can be a single neo-pixel LED.

According to various embodiments, battery 427 stores charge for operation of the pet monitoring device. One type of battery that can be used is a Li—Po battery (110 mAh), which is adequate for a day's operation. However, any type of battery can be used, depending on the application and desired use. In some examples, the battery can be recharged via a charging interface 425 that can be periodically placed in contact with a charging base 431. For instance, the device can be charged using contact and/or wireless inductive charging. If the battery life can be expected to last at least 24 hours in the present example, then the device can be charged once per day. The battery 427 and/or charging interface 425 includes a charge circuit in some instances.

According to various embodiments, the wearable pet monitoring device must be safe, secure and easy to use. In the present example, the pet monitoring device 405 is waterproof and hypoallergenic. In addition, the wearable pet monitoring device contains no serviceable parts and the electronic components are completely sealed in this example.

Although the wearable pet monitor device may be used primarily at a home in some applications, the pet monitoring device can also be used during an outing or trip. If the pet monitoring system includes one or more peripheral devices such as a camera, microphone, etc. that is located in a stationary position like a room of the house, certain features may not be available when the device is used outdoors. However, continuous monitoring of the pet can continue for measurements such as temperature, activity, GSR, position, etc. remotely in some examples.

Figure 5A:
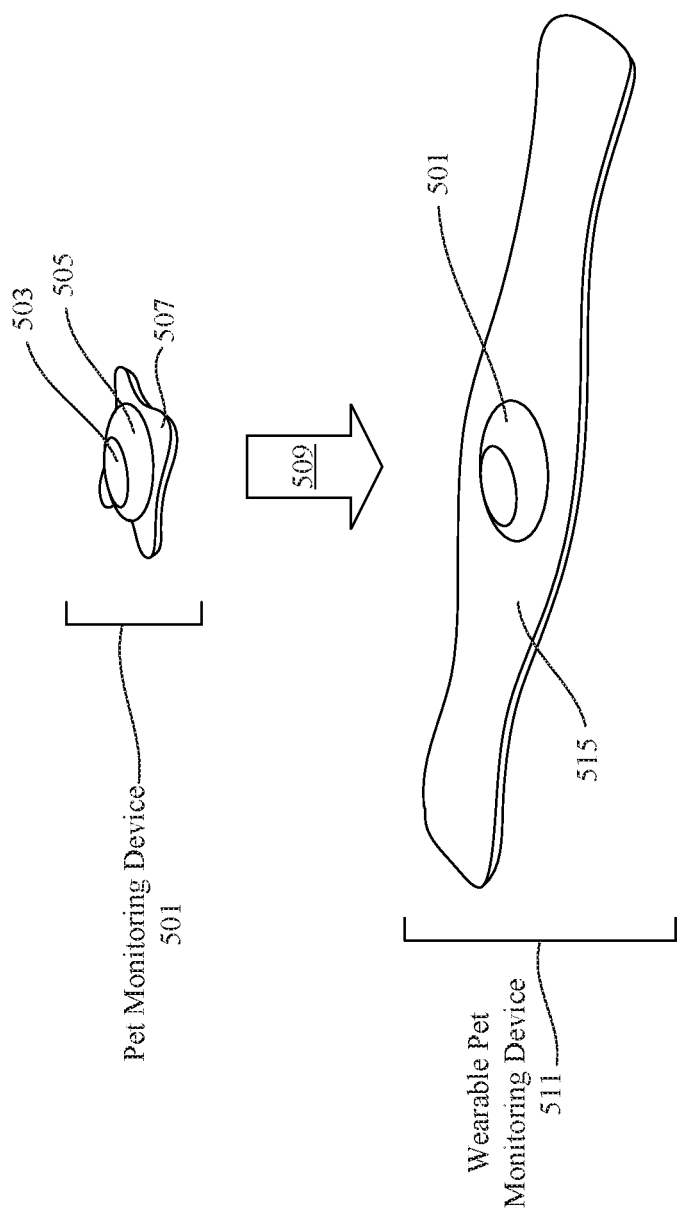
FIG. 5A is a diagrammatic representation of one example of a pet monitoring device and a wearable pet monitoring device.
Figure 5C:
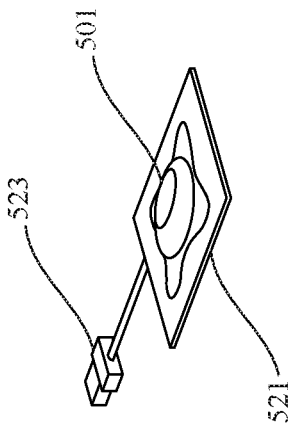
FIG. 5C is a diagrammatic representation of an example of a pet monitoring device docked on a charging base.
Figure 5B:
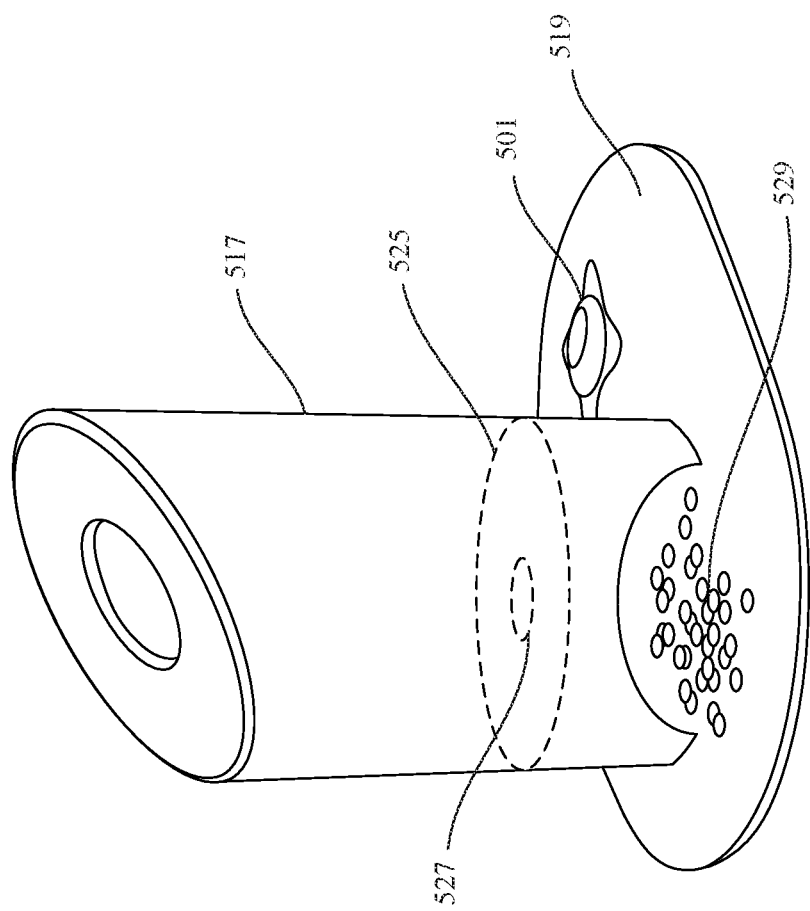
FIG. 5B is a diagrammatic representation of one example of an intelligent pet feeding station.

FIGS. 5A-5C illustrate examples of pet monitoring devices being used in different contexts. With reference to FIG. 5A, shown is a diagrammatic representation of one example of a pet monitoring device and a wearable pet monitoring device. In particular, pet monitoring device 501 is shown with a base 507, body 505 and LED window 503. When the pet monitoring device 501 is engaged 509 with wearable casing 515, the wearable pet monitoring device 511 is ready to wear by a pet. For instance, the wearable pet monitoring device can be worn around the ankle or neck of a pet and the ends can be secured, such as by a snap or other closure. In some examples, the pet monitoring device 501 can be engaged with the wearable casing 515 through a snug fit, wherein the body 505 overlaps one side of the wearable casing 515 and the base overlaps the other side. In such examples, the body 505 and base 507 may be connected with a rod that has a smaller cross-section than that of the body 505 or base 507. Furthermore, in these examples, the wearable casing can be made of an elastic material that allows some stretching to fit and secure the pet monitoring device 501. In other examples, the base 507 may slip into a pocket or sleeve located in the wearable casing 515.

Although a particular example of a pet monitoring device 501 and wearable casing 515 are shown, various designs and configurations are possible within the scope of this disclosure. Specifically, pet monitoring device 501 can be made in any of a variety of shapes. For instance, the body can be square instead of circular, the base can be circular instead of square, etc. Furthermore, the wearable casing 515 can be made in various shapes and designs. For instance, the wearable casing can alternatively be designed as a continuous loop that may or may not be adjustable in diameter. In other examples, different fastening devices can be used to secure the ends of a wearable casing 515 such as a buckle (wristwatch style), mating sides that snap together, etc.

With reference to FIG. 5B, shown is a diagrammatic representation of one example of an intelligent pet feeding station. In the present example, the intelligent pet feeding station includes a charging base. According to various embodiments, a pet station includes various features such as a charging station (shown in the present example with a pet monitoring device 501 docked to it) and a feeding station 517 mounted to a base 519. As shown, the feeding station 517 includes a partition 525 that holds the food, and a release port 527 that allows the food 529 to fall through when triggered. According to various embodiments, the release port 527 can be triggered when the monitoring system detects that the pet needs food, such as according to a schedule, the owners command, or based on measurement data taken from the pet. The intelligent pet feeding station can also include peripheral devices (not shown) such as a camera, microphone, speaker, screen, input device, etc. In some examples, the pet station includes software that allows data pre-processing, ambient sensing, content cache, and pet status assessment. Furthermore, the pet station includes content such as learning content and schedule(s), in some instances. In addition, the pet station can operate as a monitoring hub in some examples.

In the present example, the charging station can be induction-based. Although not shown, the pet station may include a power cord that can be plugged into an outlet, or the like, which can provide power for the various components of the pet station. In some examples, the peripheral device(s) can be removable from the pet station.

With reference to FIG. 5C, shown is a diagrammatic representation of another example of a pet monitoring device docked on a charging base. In particular, the charging base 521 includes a plug 523 that can be used to provide charge via a USB port, micro USB port, etc. As shown, a pet monitoring device 501 is docked on the base 521. In the present embodiment, the charging base is induction-based. However, alternative connections can be implemented within the scope of this disclosure. This type of charging base may be convenient if the pet monitoring device 501 is used remotely such as during travel or an outing, especially if a mobile device is used by an owner to view monitoring information. The charging base can be used with the mobile device to charge the pet monitoring device 523 on-the-go because the charging base is small and easy to pack, store, and use.

Figure 6:
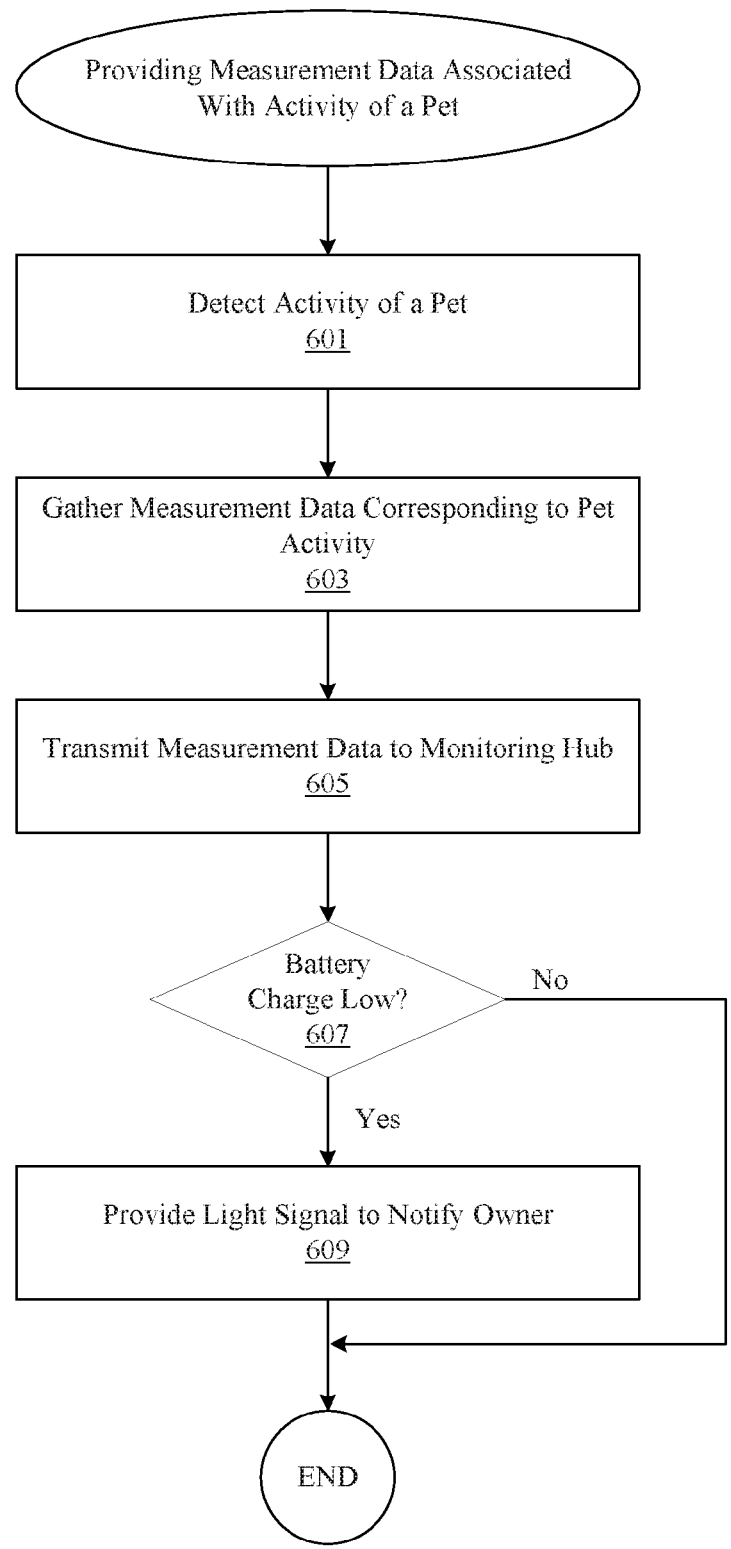
FIG. 6 is a flow diagram of one example of a process for providing measurement data associated with activity of a pet.

FIG. 6 is a flow diagram of one example of a process for providing measurement data associated with activity of a pet. In the present example, activity of a pet is detected at 601. This activity is detected by a pet monitoring device, as described above with regard to various embodiments. Detection may be based on a change in measurements, such as movement or a temperature change, in some examples. Alternatively, detection may correspond to periodically detecting activity based on a schedule, set times, etc. The pet monitoring device then gathers measurement data corresponding to the activity at 603. This measurement data includes information such as motion (i.e., activity), temperature, position, and arousal, as also described above with regard to various embodiments. The measurement data is then transmitted to a monitoring hub at 605. As described above, the monitoring hub can then process the data and provide information about the pet's activity to an owner. According to various embodiments, the monitoring hub can also provide this data to the platform for further analysis.

In the present embodiment, the pet monitoring device can also include a check to make sure its battery is sufficiently charged at 607. If the battery charge is low, a light signal can be illuminated to notify the owner 609 to charge the pet monitoring device. For instance, an LED located on the pet monitoring device can be illuminated. Alternatively or additionally, a notification can be sent to the owner via the monitoring hub and/or a mobile device to charge the pet monitoring device. If the battery charge is not found to be low, no notification is provided. As shown in the present embodiment, this battery charge check is performed after measurement data is provided. By including the battery check as part of this process, the battery is checked often. However, it should be recognized that the battery check at 607 and notification 609 can be omitted from this process in some examples, and the battery check can be performed at other times, such as at periodic intervals or set times.

Figure 7A:
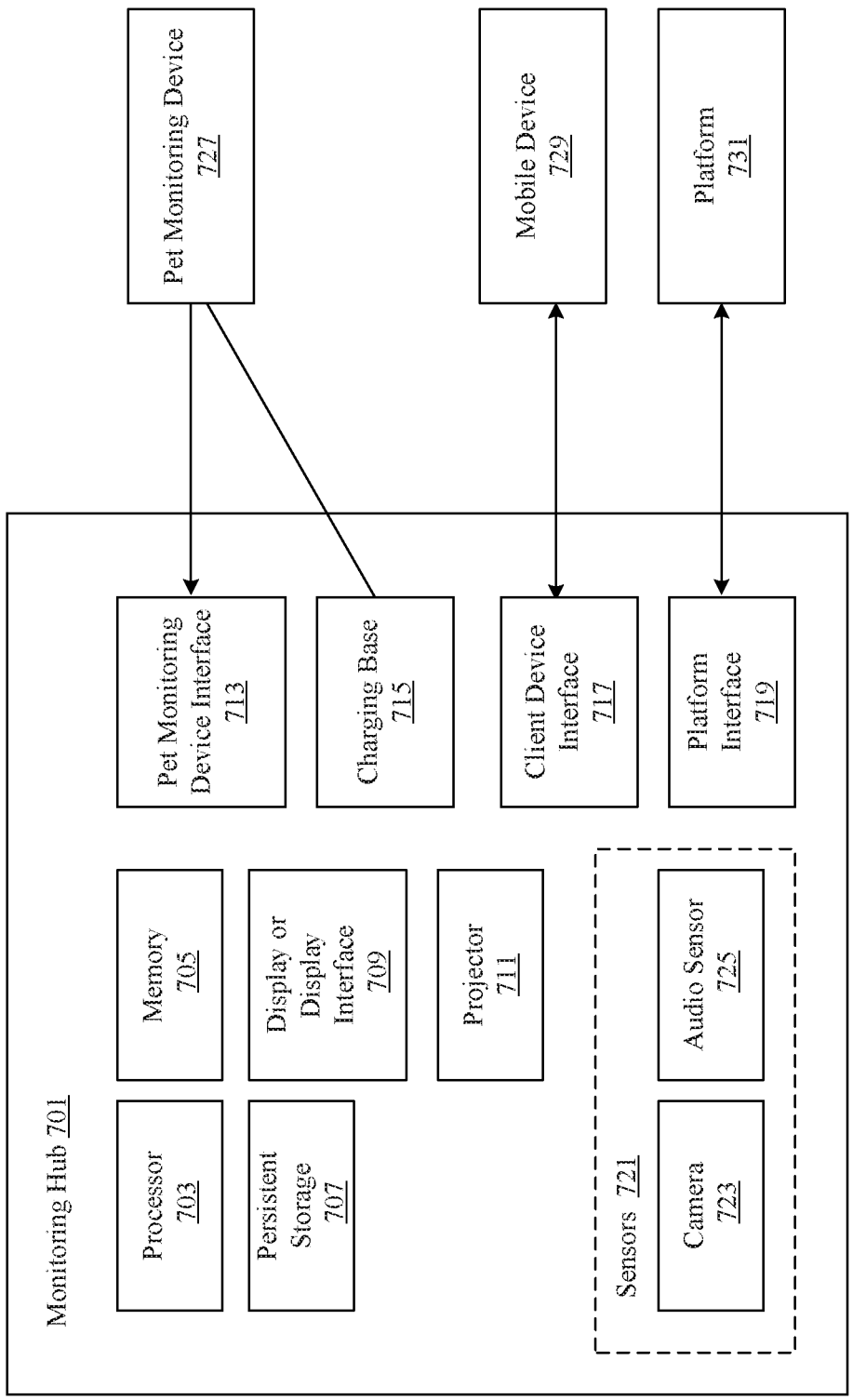
FIG. 7A is a diagrammatic representation of one example of a monitoring hub.
Figure 7B:
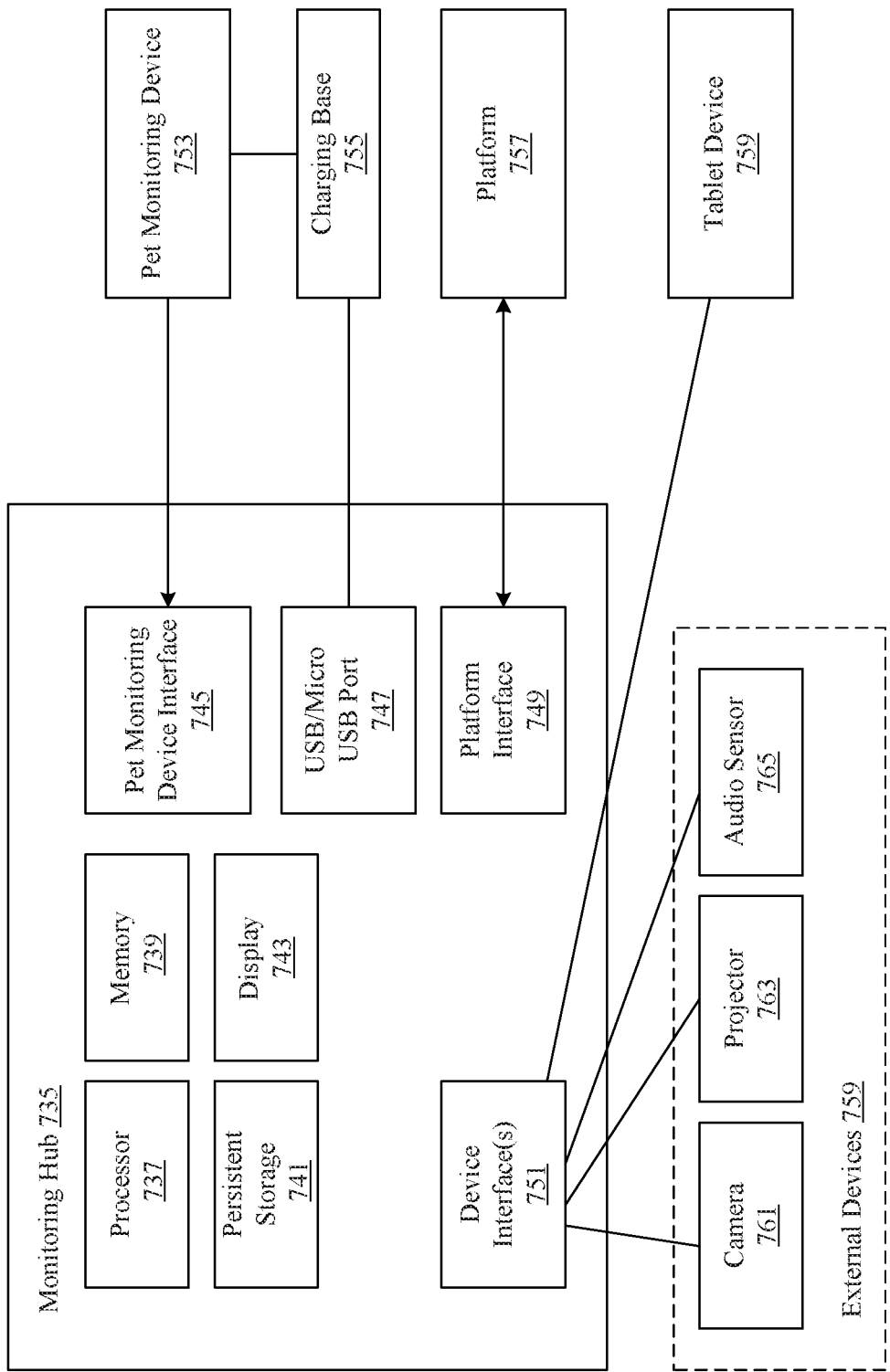
FIG. 7B is a diagrammatic representation of another example of a monitoring hub.

FIGS. 7A-7B illustrate examples of monitoring hubs. Various configurations can be used for a monitoring hub within the scope of this disclosure. With reference to FIG. 7A is shown one example of a monitoring hub. As described above with regard to various examples, a monitoring hub 701 can receive measurement data from a pet monitoring device 727 and can process this measurement data at the monitoring hub 701.

According to various embodiments, monitoring hub 701 can provide data pre-processing, ambient sensing (local sensing of environment, vibration sensing, audio sensors, cameras), content cache, and/or pet status assessment. The monitoring hub 701 can also include training content and schedule(s). In addition, the monitoring hub can provide digital signal processing, a human interface, and data security. Furthermore, model-based content adaptation can be provided at the monitoring hub 701. Accordingly, models and library content obtained from the platform 731, such as a remote pet developmental analysis platform, can be tailored for the pet's developmental stage and needs. Specifically, development models can be evaluated at the monitoring hub 701 and content from the library can be selected and customized. One example of content adaptation as applied to interactive activities includes selecting a sequence of interactive activities that is developmentally appropriate and doesn't exhaust the pet. In particular, a determination can be made about a particular pet's developmental stage and the duration of an interaction window appropriate for this stage. Using this information, content from the content library stored at the platform 731 can be selected and adapted to be appropriate for the pet. This adapted content can then be presented to the pet during an appropriate interaction window.

In the present example, the monitoring hub 701 includes a processor 703, memory 705, persistent storage 707, display or display interface 709, projector 711, sensors 721 (including camera 723 and audio sensor 725), pet monitoring device interface 713, charging base 715, client device interface 717, and platform interface 719. Although particular components are shown, it should be recognized that some of these components can be omitted without deviating from the scope of this disclosure. For instance, the projector 711 could be removed. Additional components can also be included depending on the desired operation of the monitoring hub 701.

According to various embodiments, the monitoring hub 701 can act as a pet station, such as that described with regard to FIG. 5B. In these embodiments, the pet station includes software that allows data pre-processing, ambient sensing, content cache, and pet status assessment. Content that can be included includes learning content and schedule(s).

In the present embodiment, processor 703 and memory 705 can be used to process data measurements received from pet monitoring device 727. Specifically, this data can be processed to develop observations and/or inferences as described above with regard to FIG. 3. In addition, processor 703 and memory 705 can be used to customize content for the pet such as learning materials to be stage-appropriate. Persistent storage 707 can store content and schedule(s), as well as any models, charts, etc. received from the platform 731. Furthermore, persistent storage 707 can store information specific to the pet. In the present example, display or display interface 709 allows an owner to view and/or interact with the monitoring hub 701. For instance, notifications, alerts, suggestions, etc. can be displayed for the owner through the display or display interface 709. In some instances, the display may be a screen or monitor. In addition, an input device, such as a keyboard may be included, especially if the display is not touch sensitive. In other instances, a display interface may include a port that allows a monitor to be connected as a peripheral device. In addition, the monitoring hub 701 can be connected to a computer such as a laptop, desktop, etc.

In some examples, a projector 711 can be included as part of the monitoring hub 701. For instance, a projector 711 can be included as part of a pet station and can be used to display lights or images for the pet to see. This feature can be useful to augment the environment with soothing lights, colors, or images. In some examples, this may be used to present learning content to the pet.

In the present example, sensors 721 include camera 723 and audio sensor 725. Camera 723 can be used to transmit video for an owner to see on a monitor, such as through a mobile device 729. Camera 723 can also be used to gather data measurements associated with the pet such as position. Audio sensor 725 can be used to transmit audio for an owner to hear, such as through a mobile device 729. Audio sensor 725 can also be used to gather data measurements associated with the pet's surroundings and environment. In addition, the audio sensor 725 can be used to gather data measurements about sounds from the pet, such as vocalizations, etc. In some examples, the sensors 721 can be removable from the monitoring hub 701, especially to allow better positioning of these devices relative to the pet. Other components of the monitoring hub 701 may be removable as well, such that the monitoring hub 701 has a modular style.

In the present embodiment, pet monitoring device interface 713 facilitates wireless communication with the pet monitoring device 727. In addition, the pet monitoring device 727 can be charged at a charging base 715 associated with the monitoring hub 701. The charging base 715 can be induction-based, such that the pet monitoring device 727 can be placed in contact with the charging base 715 during charging. One example of a charging base included in a pet station is described above with regard to FIG. 5B.

According to various embodiments, monitoring hub 701 includes a client device interface 717 that allows the monitoring hub 701 to communicate wirelessly with a mobile device 729, such as a smart phone, tablet or the like. A mobile device 729 includes software that facilitates features such as data pre-processing, early warning, and remote observation. In addition, content that can be included on the mobile device 729 includes learning, social, and environmental information. The owner is the typical user of the mobile device 729, and can view various data from the pet monitoring device 727. In some instances, raw data measurements from the pet monitoring device may be viewed. However, processed information from the monitoring hub 701 may provide more useful information for the owner, such as measures of health and optimal times and methods to deliver leaning information to the pet. In addition, as described above, information from sensors 721 may be accessible from mobile device 729. In various embodiments, an API interface can also be provided to third parties to allow for more applications to run on the mobile device 729.

According to various embodiments, the pet monitoring device 727 and/or monitoring hub 701 can communicate with IOS and/or Android devices. In particular, BLE is a communication stack that can be used to exchange data and upgrade firmware. In the present embodiment, the API includes access to raw data from the sensors in debug mode. A storage API can be provided for the sensors, allowing data to be downloaded and processed by the mobile device 729 on demand.

Although not shown, a tablet device can also communicate with the monitoring hub 701 through the client device interface 717. The tablet device can serve as an accessory in the delivery of structured leaning-focused interactions to the owner for use with the pet. In some examples, the tablet can have additional sensors useful in monitoring audio or video from the pet's environment, especially when the tablet device 759 is located near the pet and the mobile device is located near the owner.

In the present example, a platform interface 719 is used to communicate with platform 731. As described above with regard to various examples, the monitoring hub 701 can send data to and receive information from platform 731. For instance, monitoring hub 701 can send raw data measurements to platform 731, and can receive models and learning materials from platform 731.

With reference to FIG. 7B, shown is a diagrammatic representation of another example of a monitoring hub. In this example, monitoring hub 735 can be a mobile device, such as a smart phone, tablet, etc. Monitoring hub 735 can provide data pre-processing, content cache, and/or pet status assessment. The monitoring hub 735 can also include training content and schedule(s). In addition, the monitoring hub 735 can provide digital signal processing, a human interface, and data security. Furthermore, model-based content adaptation can be provided at the monitoring hub 735. Accordingly, models obtained from the platform 757 can be tailored for the pet's developmental stage and needs. Specifically, development models can be evaluated at the monitoring hub 735 and content from the library can be selected and customized. One example of content adaptation as applied to interactive activities includes selecting a sequence of interactive activities that is developmentally appropriate and doesn't exhaust the pet. In particular, a determination can be made about a particular pet's developmental stage and the duration of an interaction window appropriate for this stage. Using this information, content from the content library stored at the platform 757 can be selected and adapted to be appropriate for the pet. This adapted content can then be presented to the pet during an appropriate interaction window.

In the present example, the monitoring hub 735 includes a processor 737, memory 739, persistent storage 741, display 743, device interface(s) 751, pet monitoring device interface 745, USB/Micro USB port 747, and platform interface 749. Although particular components are shown, it should be recognized that some of these components can be omitted without deviating from the scope of this disclosure. Additional components can also be included depending on the desired operation of the monitoring hub 735 and the pet monitoring system.

In the present embodiment, processor 737 and memory 739 can be used to process data measurements received from pet monitoring device 753. Specifically, this data can be processed to develop observations and/or inferences as described above with regard to FIG. 3. In addition, processor 737 and memory 739 can be used to customize content for the pet such as learning materials to be stage-appropriate. Persistent storage 741 can store content and schedule(s), as well as any models, charts, etc. received from the platform 757. Furthermore, persistent storage 757 can store information specific to the pet.

In the present example, display 743 allows an owner to view and or interact with the monitoring hub 735. For instance, the owner can view observations or inferences made about the pet, view a video feed, listen to audio from the pet's room, and input data through the display 743. In addition, notifications, alerts, suggestions, etc. can be displayed for the owner through the display 743.

In the present embodiment, device interface(s) 751 facilitates the operation of peripheral devices with the pet monitoring system. For instance, ambient sensing, such as local sensing of environment, vibration sensing, audio sensing, and visual monitoring may be desirable. As such, various external devices 759 can be included as part of the pet monitoring system. In particular, camera 761 can be used to transmit video for an owner to see on a monitor, such as through display 743. Camera 763 can also be used to gather data measurements associated with the pet such as position or movement. Audio sensor 765 can be used to transmit audio for an owner to hear, such as through speakers included in the mobile device. Audio sensor 765 can also be used to gather data measurements associated with the pet's surroundings and environment. In addition, the audio sensor 765 can be used to gather data measurements about sounds from the pet, such as vocal articulation, etc. In some examples, a projector 763 can be included as part of the monitoring hub 735. Projector 763 can be used to display lights or images for the pet to see. This feature can be useful to augment the environment with soothing lights, colors, or images. In some examples, this may be used to present as leaning content to the pet. According to various embodiments, the external devices 759 communicate wirelessly with monitoring hub 735 through the device interface(s) 751. Because the devices are physically separate from the monitoring hub 735, these devices can be conveniently positioned relative to the pet.

In the present embodiment, a tablet device 759 (or other mobile device) can communicate with monitoring hub 735 through device interface(s) 751. The tablet device 759 can serve as an accessory in the delivery of structured learning-focused interactions to the owner for use with the pet. In some examples, the tablet can have additional sensors useful in monitoring audio or video from the pet's environment, especially when the tablet device 759 is located near the pet and the mobile device is located near the owner.

In the present embodiment, monitoring hub 735 includes numerous interfaces. For instance, pet monitoring device interface 745 facilitates wireless communication with the pet monitoring device 753. USB/Micro USB Port 747 can be used as a plug-in for charging base 755, such as the one shown in FIG. 5C. The charging base 755 can be induction-based, such that the pet monitoring device 753 can be placed in contact with the charging base 755 during charging. In the present example, a platform interface 749 is used to communicate with platform 757. As described above with regard to various examples, the monitoring hub 735 can send data to and receive information from platform 757. For instance, monitoring hub 735 can send raw data measurements to platform 757, and can receive models and learning materials from platform 757.

In the present example, the monitoring hub 735 can be an IOS, Android, or similar device. BLE is a communication stack that can be used to exchange data and upgrade firmware. In the present embodiment, the API includes access to raw data from the sensors in debug mode. A storage API can be provided for the sensors, allowing data to be downloaded and processed by the mobile device on demand.

According to various embodiments, if a mobile device is used as a monitoring hub 735, then the pet monitoring system can be portable. As such, the monitoring system can be used outdoors, at remote locations outside of the home, etc. With this system, continuous monitoring can remain uninterrupted when the pet is taken outside or to another location. The pet monitoring device 753 can continue to transmit data to the mobile device in these embodiments. If there are other peripheral devices used for monitoring at home, such as a camera 761, audio sensor 765, or the like, which would be cumbersome or inconvenient to use while outdoors or traveling, these devices can be inactive during these outings. For instance, the monitoring system can be placed in a remote monitoring mode so that the peripheral devices, such as external devices 759 and tablet device 759, can be in a sleep mode or an energy saving mode and not transmit information during the outing.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

The invention claimed is:

1. A system comprising:
 a pet monitoring device having a plurality of sensors configured to gather measurement data from a pet, the measurement data including motion and arousal; and
 a monitoring hub configured to receive the measurement data from the pet monitoring device and analyze the measurement data,
 wherein aggregated measurement data is obtained from a remote platform, the remote platform configured to receive information from a plurality of monitoring hubs associated with a plurality of pet monitoring devices,
 wherein the aggregated measurement data is analyzed using machine learning techniques to generate a learning receptivity model for predicting times and durations when pets will be receptive to learning, and
 wherein the measurement data from the pet monitoring device is analyzed based on the learning receptivity model to predict a time and duration when a pet associated with the pet monitoring device will be receptive to learning.

2. The system of claim 1, wherein the pet monitoring device is wearable as a collar.

3. The system of claim 1, wherein the pet monitoring device is wearable as an anklet.

4. The system of claim 1, wherein the monitoring hub is further configured to suggest learning content for the pet, wherein the learning content is customized to a developmental stage associated with the pet, and wherein the developmental stage reflects past learning experiences.

5. The system of claim 1, further comprising a camera and audio sensor, wherein the monitoring hub receives video and audio data from the camera and audio sensor.

6. The system of claim 1, wherein learning receptivity model is periodically refined based on additional sensor data and measurement data received from the plurality of pet monitoring systems.

7. A method comprising:
 receiving measurement data at a monitoring hub, the measurement data obtained from a plurality of sensors associated with a pet monitoring device;
 obtaining aggregated measurement data from a remote platform, the remote platform configured to receive information from a plurality of monitoring hubs associated with a plurality of pet monitoring devices,
 analyzing the aggregated measurement data using machine learning techniques to generate a learning receptivity model for predicting times and durations when pets will be receptive to learning, and
 analyzing the measurement data from the pet monitoring device based on the learning receptivity model to predict a time and duration when a pet associated with the pet monitoring device will be receptive to learning.

8. The method of claim 7, wherein the measurement data includes position and movement of the pet.

9. The method of claim 8, wherein the measurement data further includes arousal.

10. The method of claim 7, wherein the pet monitoring device is wearable as a collar or anklet.

11. The method of claim 1, further comprising presenting learning content customized to a developmental stage associated with the pet.

12. The method of claim 11, wherein the customized learning content includes informational material for an owner associated with the pet.

13. The method of claim 11, wherein the customized learning content includes suggestions for an owner associated with the pet.

14. The method of claim 1, further comprising determining a developmental stage associated with the pet based on the measurement data.

15. The method of claim 14, wherein predicting a time and duration is based on the developmental stage.

16. The method of claim 7, wherein analyzing the measurement data comprises processing the data measurement into an observation about the pet and comparing the observation to the learning receptivity model.

17. The method of claim 16, wherein the observation includes one of sleep, mobility, stress, position, comfort, health, vigilance, or articulation.

18. The method of claim 7, wherein analyzing the measurement comprises processing the data measurement into an inference about the pet and comparing the inference to the learning receptivity model.

19. The method of claim 18, wherein the inference includes one of receptivity to learning, pet well-being, presence of owner, environmental factors; safety of pet or emotional state of pet.

20. The method of claim 7, further comprising presenting learning content customized based on previous learning associated with the pet.

* * * * *